United States Patent [19]

Arpin

[11] Patent Number: 5,037,923
[45] Date of Patent: Aug. 6, 1991

[54] NOVEL IMIDO POLYMERS

[75] Inventor: René Arpin, Lyon, France

[73] Assignee: Rhone-Poulenc Chimie, Courbevoie, France

[21] Appl. No.: 544,061

[22] Filed: Jun. 26, 1990

Related U.S. Application Data

[63] Continuation of Ser. No. 387,772, Aug. 1, 1989, abandoned, which is a continuation of Ser. No. 112,460, Oct. 26, 1987, abandoned.

[51] Int. Cl.$^5$ .............................................. C08F 22/40
[52] U.S. Cl. ................................................... 526/262
[58] Field of Search ........................................ 526/262

[56] References Cited

U.S. PATENT DOCUMENTS

| | | | |
|---|---|---|---|
| 3,988,299 | 10/1976 | Malofsky | 526/262 |
| 4,463,147 | 7/1984 | Diethelm et al. | 526/262 |

Primary Examiner—Joseph L. Schofer
Assistant Examiner—N. Sarofim
Attorney, Agent, or Firm—Burns, Doane, Swecker & Mathis

[57] ABSTRACT

Imido prepolymers and thermally stable imido polymers, well adapted for the production of a wide variety of useful molded or laminated shaped articles, or cellular materials, are prepared by reacting, at elevated temperatures, (a) at least one N,N'-bismaleimide, with (b) at least one aromatic di(meth)acrylate, in the presence of a catalytically effective amount of (c) an imidazole.

11 Claims, No Drawings

NOVEL IMIDO POLYMERS

This application is a continuation of application Ser. No. 387,772, filed Aug. 1, 1989, now abandoned, which is a continuation of application Ser. No. 112,460 filed Oct. 26, 1987 now abandoned.

BACKGROUND OF THE INVENTION

1. Field of the Invention

The present invention relates to novel thermally stable polymers produced from bisimides.

2. Description of the Prior Art

Polymers produced by reacting an N,N'-bisimide of an unsaturated dicarboxylic acid such as, for example, an N,N'-bismaleimide, with a diprimary diamine are described in French Patent No. 1,555,564. The quantities of N,N'-bisimide and of diamine are selected such that the ratio:

$$\frac{\text{number of moles of bisimide}}{\text{number of moles of diamine}}$$

is at least equal to 1, and preferably is less than 50. Thermally stable resins are thus produced which withstand severe thermal stresses remarkably well.

The above-mentioned French patent also discloses that the resins may be prepared in bulk by heating intimate admixture of the reactants. These resins may also be prepared in an inert polar diluent such as dimethylformamide, N-methylpyrrolidone or dimethylacetamide. The latter process is the preferred, when the end application of the polymer requires it to be in solution form.

For many uses, the noted '564 French patent indicates that a two-step process is advantageous. In a first stage, a prepolymer is prepared by heating the intimate admixture of the two reactants to a temperature on the order of 100° to 250° C. The prepolymer thus produced may be employed in solution, suspension or powder form, or else may simply be shaped by casting while in hot state. In a second stage, curing of the prepolymer is effected by heating it to temperatures on the order of 300° C., under pressure if desired.

These polymers may be converted into films or into polycellular materials. They are of very special interest for the preparation of molded shaped articles, in combination, if desired, with fibrous or powdered fillers or laminates based on inorganic fibers (single fibers, fiber cloth or nonwovens) such as, for example, carbon, boron or glass fibers. However, the preparation and use of such polymers require strict precautions to be observed for reasons of health and hygiene when the diprimary diamine is aromatic in nature, because of the toxicity associated with certain of such aromatic diamines.

SUMMARY OF THE INVENTION

Accordingly, a major object of the present invention is the provision of novel imido polymers, the production of which does not entail the use of diamines.

Briefly, the present invention features polymers containing imide groups, prepared by reacting, at a temperature ranging from 50° C. to 300° C.:

(a) at least one N,N'-bisimide having the formula:

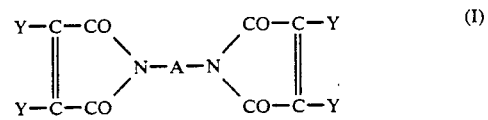

in which the symbols Y, which are identical or different, each denote H, CH₃ or Cl, the symbol A denotes a divalent radical selected from among cyclohexylene, phenylene, 4-methyl-1,3-phenylene, 2-methyl-1,3-phenylene, 5-methyl-1,3-phenylene, 2,5-diethyl-3-methyl-1,4-phenylene, and the radicals of the formula:

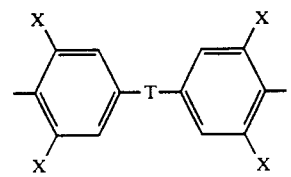

in which T denotes a single valence bond or a group:

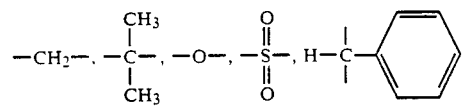

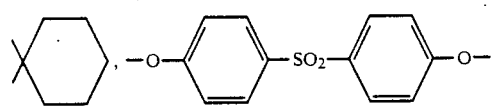

and the symbols X, which are identical or different, each denote a hydrogen atom or a methyl, ethyl or isopropyl radical;

with (b) at least one aromatic diacrylate having the formula:

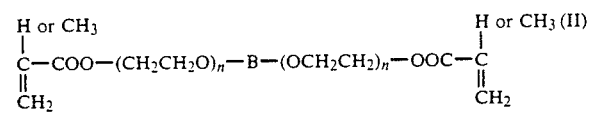

in which the symbol B denotes a divalent radical of the formula:

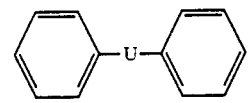

in which the symbol U denotes a single valence bond or a group:

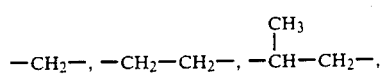

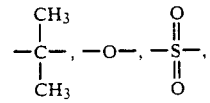

and the symbols n, which are identical or different, each denote a number equal to zero, 1, 2, 3, 4 or 5, in the presence of:

(c) an imidazole compound.

DETAILED DESCRIPTION OF THE PREFERRED EMBODIMENTS OF THE INVENTION

More particularly according to the present invention, exemplary of the bisimides having the formula (I), representative are:

N,N'-Meta-phenylenebismaleimide,
N,N'-Para-phenylenebismaleimide,
N,N'-4,4'-Diphenylmethanebismaleimide,
N,N'-4,4'-Diphenyl ether bismaleimide,
N,N'-4,4'-Diphenyl sulfone bismaleimide,
N,N'-1,4-Cyclohexylenebismaleimide,
N,N'-4,4'-Diphenyl-1,1-cyclohexanebismaleimide,
N,N'-4,4'-Diphenyl-2,2-propanebismaleimide,
N,N'-4,4'-Triphenylmethanebismaleimide,
N,N'-2-Methyl-1,3-phenylenebismaleimide,
N,N'-4-Methyl-1,3-phenylenebismaleimide,
N,N'-5-Methyl-1,3-phenylenebismaleimide.

These bismaleimides may be prepared according to the process described in U.S. Pat. No. 3,018,290 and British Patent No. 1,137,290. N,N'-4,4'-Diphenylmethanebismaleimide, either alone or admixed with N,N'-2-methyl-1,3-phenylenebismaleimide, N,N'-4-methyl-1,3-phenylenebismaleimide and/or N,N'-5-methyl-1,3-phenylenebismaleimide are preferably used to carry out the present invention.

As specific examples of diacrylates of the formula (II), particularly representative are the diacrylates and the dimethacrylates of the following diphenols, whether or not di-(mono- or polyoxyethylated):

4,4'-Dihydroxydiphenylmethane,
Bisphenol A,
4,4'-Dihydroxydiphenyl ether.

Diacrylates and dimethacrylates of di(mono- or polyoxyethylated) bisphenol A are preferably selected. The compounds (b) which are more particularly preferred are the diacrylate (or the dimethacrylate) of di(-monooxyethylated) bisphenol A and the diacrylate (or the dimethacrylate) of di(dioxyethylated) bisphenol A [cf. formula (II) in which the symbol B denotes the radical:

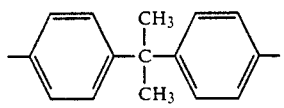

and n is equal to 1 and 2].

The quantities of N,N'-bisimide(s) (a) and of diacrylate(s) (b) are selected such that the ratio r:

$$\frac{\text{number of moles of bisimide(s) } (a)}{\text{number of moles of diacrylate(s) } (b)}$$

ranges from 1.7/1 to 20/1, and preferably from 2/1 to 8/1.

The imidazole compound (c) corresponds to the general formula:

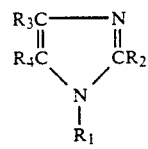

in which $R_1$, $R_2$, $R_3$ and $R_4$, which are identical or different, each denote a hydrogen atom, an alkyl or alkoxy radical containing from 1 to 20 carbon atoms, or a vinyl, phenyl or nitro radical, with the proviso that $R_3$ may form, together with $R_4$ and the carbon atoms from which they depend, a single ring member such as, for example, a benzene ring.

Exemplary of such imidazole compounds, representative are, in particular: imidazole or glyoxaline, 1-methylimidazole, 2-methylimidazole, 1,2-dimethylimidazole, 1-vinylimidazole, 1-vinyl-2-methylimidazole and benzimidazole.

The imidazole compound is employed in catalytically effective amounts. Depending on the nature of the imidazole compound and depending on the polymerization rate desired during the application stage, the imidazole compound is employed in a proportion, expressed as the number of moles of compound (c) per 100 g of the mixture bisimide(s) (a) + diacrylate(s) (b), situated in the range of from $0.15 \times 10^{-3}$ to $6 \times 10^{-3}$, and preferably from $0.4 \times 10^{-3}$ to $4 \times 10^{-3}$.

The polymers according to the invention may be prepared in bulk, by directly heating the bisimide(s) (a), the acrylate reactant (b) and the imidazole compound (c), at least until a homogenous liquid mixture is obtained. The temperature may vary depending on the physical state of the compounds present, but it generally ranges from 50° C. to 300° C. It is advantageous to have and to maintain the starting material compounds in an intimately mixed state, both before and during the heating, for example, by means of effective stirring. The imidazole compound (c) is preferably added at the beginning of the operation to a well-stirred mixture of the reactants (a) and (b) such as to permit it to be rapidly dispersed. When this compound is particularly active, it is desirable to add it in a solvent or diluent which is compatible with the reaction mixture, to avoid its encapsulation in the polymer network which is formed. It has been found that it may be advantageous to employ one of the polar organic liquids referred to below as a solvent or diluent.

The preparation of the polymers according to the invention may also be carried out by heating the mixture of the reactants in an organic diluent which is liquid over at least a part of the range 50° C.–300° C. Exemplary of such diluents, particularly representative are the aromatic hydrocarbons such as xylenes and toluene, halogenated hydrocarbons such as chlorobenzenes, polar solvents such as dioxane, tetrahydrofuran and dibutyl ether, dimethylformamide, dimethyl sulfoxide, N-methylpyrrolidone, dimethylacetamide, methylglycol and methyl ethyl ketone. The polymer solutions or suspensions may be used as such for numerous applications. The polymers may also be isolated, for example by filtration, if desired after precipitation by means of an organic diluent which is miscible with the solvent employed. In this connection, a hydrocarbon whose boiling point does not markedly exceed 120° C. may be employed to advantage.

It should be appreciated that the properties of the polymers according to the invention may vary widely, depending especially on the precise nature of the reactants employed, on the proportions of reactants which are selected and on the precise temperatures within the abovementioned range. Insofar as the resultant polymers are concerned, these may be cured polymers which are insoluble in the usual solvents such as, for example, those liquids mentioned in the preceding paragraph, and which do not exhibit any appreciable softening below the temperature at which they begin to decompose.

However, these polymers may also be in the form of prepolymers (P) which are soluble in polar organic solvents and have a softening point at a temperature below 200° C. (this softening point typically ranges from 50° to 150° C.). These prepolymers may be produced in bulk by heating the mixture of reactants until a homogeneous or pasty material is obtained, at a temperature generally ranging from 50° to 180° C. for a period of time which may range from a few minutes to several hours (this time period is proportionately shorter, the higher the temperature which is selected). Before the mixture of reactants is heated, it is advantageous, in this case as well, to convert it into an intimate mixture by stirring beforehand. This also constitutes a preferred embodiment for addition of the imidazole compound (c), namely, that indicated above in connection with the direct preparation of cured polymers. The preparation of the prepolymers may also be carried out in suspension or in solution in a diluent which is liquid at least in a part of the range 50°–180° C.

The prepolymers (P) may be employed in the form of a liquid mass, simple casting while hot being sufficient for shaping and producing molded articles. It is also possible, after they have been cooled and ground, to use them in the form of powders which are remarkably well suitable for compression molding applications, if desired in the presence of fillers (powders, spheres, granules, fibers or flakes, etc.). In the form of suspensions or solutions, the prepolymers (P) may be used for the production of preimpregnated intermediate articles, the reinforcement of which comprising fibrous materials (in the form of single fibers, or woven or nonwoven sheets) based on aluminum or zirconium silicate or oxide, carbon, graphite, boron, asbestos or glass. These prepolymers (P) may also be employed for the production of cellular materials after a blowing agent such as, for example, azodicarbonamide, has been added.

In a second stage, the prepolymers (P) may be cured by heating up to temperatures on the order of 300° C., generally from 150° to 300° C. An additional shaping operation may be carried out during the cure, under vacuum or at a superatmospheric pressure if desired, it also being possible for such operations to be carried out consecutively.

In a preferred embodiment of the present invention, the operation is carried out in two stages, the first stage including heating the mixture of the reactants from 50° C. to 180° C. to form a prepolymer (P), and the second stage including curing the prepolymer (P), after the shaping thereof, by heating same up to temperatures on the order of 300° C.

However, in a more preferred embodiment of the present invention, the operation is carried out in two stages, but by using, in the first stage, a continuous process for preparing the prepolymer (P), comprising separately introducing the bisimide(s) (a) in a divided solid state, the diacrylate(s) (b) in a liquid or molten state, and the imidazole compound (c) in a solid state or in solution, into a mixer equipped with an extruder screw.

By the expression "mixer equipped with an extruder screw" is intended apparatus which does not form any dead zones as the material advances. Machines of this type, which may include one or more screws, are described in E. G. Fisher, *Extrusion of Plastics* (Interscience Publishers, 1964), pages 104 to 108. These mixers may contain two endless screws intermeshing intimately and rotating in the same direction. Apparatus of this type, adapted more particularly for the preparation of alkali metal terephthalates, is described in French Patent No. 1,462,935. Another variety of mixers which can be employed includes machines containing an endless screw with interrupted flights producing a rotary motion and an oscillating motion simultaneously in the axial direction, and housed in a barrel comprising teeth which interact with the interrupted fins of the screw. Machines of this type are described in French Patent Nos. 1,184,392, 1,184,393, 1,307,106 and 1,369,283.

For reasons of convenience in use, it is preferable to employ the bisimide(s) (a) in the form of particles, the size of which ranges from 0.1 to 5 mm. Introduction of such particulates into the mixer may be regulated by known means, such as metering screws or balances.

The diacrylate(s) (b) are introduced into the mixing zone in liquid state. Their introduction may be carried out by means of a metering pump. Introduction of the reactant (b) may be conducted at one or more locations situated preferably downstream of the bisimide(s) (a) inlet zone.

The imidazole compound (c) may be incorporated in the solid state with the acrylate reactant (b). However, it is preferable to incorporate the imidazole compound (c) in the form of a solution in a polar solvent, such as those discussed above. In this preferred embodiment, the imidazole compound (c) may very well be incorporated with the acrylate reactant (b), but its introduction into the mixer may also be accomplished at any other location in the mixing zone, preferably downstream of the acrylate reactant (b) inlet zone.

The maintaining of the mixing zone at the selected temperature of from 50° C. to 180° C., and preferably from 130° C. to 160° C., is typically accomplished by controlled heating of the housing of the mixer employed. In addition, it is also possible to carry out a controlled heating of the endless screw or screws in the machine. Insofar as the housing is concerned, the heating may be applied uniformly throughout its length, but it is also possible to arrange a number of adjoining heating zones providing the mixing zone with a temperature which may, for example, increase in the direction of travel of the material. It is preferable for the temperature to be in the range 20°–130° C. upstream of the point of initial introduction of the reactant (b).

The residence time of the materials in the mixing zone may vary to a certain degree depending on the bisimide(s) (a) employed, on the temperature selected and on the weight ratio of the reactants. As a general rule, it is on the order of 1 to 30 minutes. At the outlet of the mixer, the softening point of the prepolymer (P) can be regulated by heating the latter in an oven under determined temperature and duration conditions. For example, when the reactant (a) is N,N'-4,4'-diphenylmethanebismaleimide and the ratio r is close to 5/1, prepolymers which have softening points on the order of 50° C. to 60° C. are obtained using a prepolymerization temperature of 155° C. and a residence time within the range of 5–10 minutes.

The polymers according to the invention are of interest for industrial applications which require materials having good mechanical and electrical properties, together with a high chemical inertness at temperatures of from 200° to 300° C. By way of examples, they are suitable for the manufacture of plate or tubular insulators for electrical transformers, printed circuit boards, pinions, rings, and the like. The preimpregnated articles can be used for producing components of various shapes and for various purposes in many industries such as, for example, in aeronautics. These components, known as laminates, which may be solids of revolution, are produced by arraying several layers of prepregs onto a form or a support. The prepregs may also be used as reinforcements or as means for repairing worn components. It will be recalled that to produce molded articles, for example, it is possible to begin either with the mixture of the reactants (a)+(b)+(c), or with a prepolymer (P). When directly beginning from the mixture of the reactants, this mixture is given the shape of the required article and the curing is then effected by heating. When beginning with the prepolymer (P), this may be molded by simple casting while in hot state, or by injection molding and its cure is then effected by heating.

In order to further illustrate the present invention and the advantages thereof, the following specific examples are given, it being understood that same are intended only as illustrative and in nowise limitative.

EXAMPLE 1

This example describes production of a polymer according to the invention by a noncontinuous process.

Into a reactor equipped with a stirrer, and placed in an oil bath thermostated at 160° C., were introduced:

(i) 300 parts by weight of N,N'-diphenylmethanebismaleimide, having a softening point of 155° C.; and (ii) 100 parts by weight of di(dioxyethylated) bisphenol A diacrylate; this compound is available commercially from UCB under the registered trademark Ebecryl 150.

The mixture was stirred for 30 minutes until a homogeneous mass was obtained. 0.28 parts by weight of imidazole were then added in the form of a 17% by weight solution in N-methylpyrrolidone.

Stirring of the reaction mixture was continued for 45 minutes at 160° C., and the mixture was then cast on a tray. After cooling, the resulting prepolymer was ground and a yellow powder which was soluble in solvents such as, for example, N-methylpyrrolidone and dimethylformamide, was obtained. The prepolymer had a softening point of 80° C.; its viscosity, measured as a 50% by weight solution in N-methylpyrrolidone, was 2.5 poises.

A solution of prepolymer, 50% by weight in N-methylpyrrolidone, was employed to coat a glass cloth (manufactured by Porcher under the reference 7628) which had a weight per unit area of 200 g/m² and which had been subjected to a treatment with gamma-aminopropyltriethoxysilane (Union Carbide silane A 1100). The impregnated cloth contained 35 g of prepolymer per 65 g of cloth. It was dried in a ventilated atmosphere for 5 minutes at 130° C. 6 squares (15×15 cm) were then cut therefrom and were stacked, with a 35 μm thick copper sheet placed on one of the outer face surfaces of the stack, and the assembly was placed between the platens of a press under the following conditions:

Pressure: $40 \times 10^5$ Pa,

Heating of the press platens: 15 minutes at 150° C., then 45 minutes at 200° C.

During the lamination operation, a degree of polymer creep of about 20% by weight was observed. After a thermal finishing treatment for 6 hours at 235° C., the adhesion of the copper to the 6-layer laminate was examined. This adhesion, measured with a tensometer by pulling the copper at an angle of 90° (according to the standard MIL P 55 617 B with a pull speed of 55 mm/min) was on the order of 15 N/cm. This value was maintained after an aging period of 1,000 hours at 200° C.

As a comparative test, the above Example 1 was reproduced, but in the absence of imidazole. When heated to 160° C., the reaction mixture set solid after 1 hour 30 minutes of mixing. After cooling and grinding, the powder obtained had a softening point of 70° C. Its solubility in the abovementioned solvents was very low. Analysis showed that the bismaleimide had reacted with the diacrylate only to a very slight extent or not at all. The prepolymer obtained in this manner was unsuitable for the applications described, in particular for the preparation of laminates.

EXAMPLE 2

This example describes production of a polymer in accordance with the invention by a continuous process.

The apparatus employed was a Buss laboratory mixer designated as "Ko-Kneader" model PR 46. This mixer comprised an endless screw consisting of a shaft fitted with interrupted helical flights, with the interruptions defining separate fins. It was driven by an appropriate mechanism. The screw was housed in a body comprising three adjoining jacketed coaxial cylindrical barrels; the inner wall of the mixer body was provided with tooth-shaped projections. The screw was driven with a rotary motion and simultaneously with an oscillating motion in its axial direction, and this created an exchange of material in two directions.

Water, at 20° C., was circulated in the first jacket, and a fluid heated to 155° C. in the other two. The speed of rotation of the screw was 60 revolutions/minute.

N,N'-4,4'-diphenylmethanebismaleimide was introduced into the first part of the mixer (corresponding to the first barrel) by means of a metering balance at a rate of 1,172 g/hr. The bismaleimide was introduced in the form of particles, the average size of which was on the order of 0.25 mm.

The mixture of di(dioxyethylated) bisphenol A diacrylate and imidazole solution (in accordance with Example 1) was introduced into the second part of the mixer (corresponding to the second barrel), at a rate of 340 g/hr.

The reactants were metered such that the bismaleimide represented 77.5% of the weight of the bismaleimide/diacrylate mixture and the imidazole 0.06% of the weight of the same mixture.

The average residence time of the material in the mixer was on the order of 6 minutes, 30 seconds. A prepolymer whose softening point was on the order of 55° C. was collected at the outlet of the machine. When heated for 17 minutes to 170° C., this prepolymer had a softening point of 80° C. It was soluble in solvents such as, for example, N-methylpyrrolidone and dimethylformamide, and it had a viscosity of 2.5 poises (measured as indicated in Example 1).

The prepolymer obtained in this manner was used to prepare prepregs and laminates comprising 18 covers (18 layers of prepregs) under the conditions described above in Example 1 (it should be noted that no copper sheet was employed in this case). After another cure for 6 hours at 235° C., the laminates had the following mechanical characteristics:

Flexural strength measured at 200° C. (according to French standard NF T 51 001): 340 MPa, Flexural modulus: 14,000 MPa.

Furthermore, the prepolymer obtained was subjected to TMA measurements (thermal mechanical analysis; ASTM standard E 831-81 with a rate of temperature increase of 5° C./min). The product cured again at 235° C. and was observed to have a mean expansion coefficient of 50 μm/m/°C. between 40° C. and 300° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An imido polymer essentially consisting of the polymerizate of:

(a) at least one N,N'-bisimide having the formula:

$$\begin{array}{c} Y-C-CO \\ \parallel \\ Y-C-CO \end{array} N-A-N \begin{array}{c} CO-C-Y \\ \parallel \\ CO-C-Y \end{array} \quad (I)$$

in which the symbols Y, which are identical or different, are each H, CH$_3$ or Cl;

the symbol A is cyclohexylene, phenylene, 4-methyl-1,3-phenylene, 2-methyl-1,3-phenylene, 5-methyl-1,3-phenylene, 2,5-diethyl-3-methyl-1,4-phenylene, or a radical of the formula:

[structure with X substituents and T linker]

in which T is a single valence bond or a group:

$-CH_2-$, $-\underset{\underset{CH_3}{|}}{\overset{\overset{CH_3}{|}}{C}}-$, $-O-$, $-\underset{\underset{O}{\parallel}}{\overset{\overset{O}{\parallel}}{S}}-$, $H-\underset{|}{\overset{|}{C}}-\bigcirc$,

[cyclohexyl] , or $-O-\bigcirc-SO_2-\bigcirc-O-$ and the symbols X, which are identical or different, are each a hydrogen atom or a methyl, ethyl or isopropyl radical, with (b) at least one aromatic diacrylate of the formula:

$$\underset{CH_2}{\overset{H \text{ or } CH_3}{\underset{\parallel}{\overset{|}{C}}}}-COO-(CH_2CH_2O)_n-B-(OCH_2CH_2)_n-OOC-\underset{CH_2}{\overset{H \text{ or } CH_3 \text{ (II)}}{\underset{\parallel}{\overset{|}{C}}}}$$

in which the symbol B is a divalent radical of the formula:

[phenyl-U-phenyl structure]

wherein the symbol U is a single valence bond or a group:

$-CH_2-$, $-CH_2-CH_2-$, $-\overset{\overset{CH_3}{|}}{CH}-CH_2-$, $-\underset{\underset{CH_3}{|}}{\overset{\overset{CH_3}{|}}{C}}-$, $-O-$, $-\underset{\underset{O}{\parallel}}{\overset{\overset{O}{\parallel}}{S}}-$, and the symbols n, which are identical or different, are each a number equal to zero, 1, 2, 3, 4 or 5 wherein the ratio between the number of moles of the at least one N,N'-bisimide (a) and the number of moles of the at least one aromatic diacrylate (b) ranges from 1.7/1 to 20/1;

said polymerizate being formed in the presence of:

(c) a catalytically effective amount of an imidazole compound.

2. The imido polymer as defined by claim 1, said at least one N,N'-bisimide (a) comprising N,N'-4,4'-diphenylmethanebismaleimide or admixture thereof with N,N'-2-methyl-1,3-phenylenebismaleimide, N,N'-4-methyl-1,3-phenylenebismaleimide and/or N,N'-5-methyl-1,3-phenylenebismaleimide.

3. The imido polymer as defined by claim 1, said at least one aromatic diacrylate (b) comprising a diacrylate or dimethacrylate of a di(polyoxyethylated) bisphenol A.

4. The imido polymer as defined by claim 1, said ratio ranging from 2/1 to 8/1.

5. The imido polymer as defined by claim 1, in thermally stable thermoset state, solvent insoluble, and exhibiting no appreciable softening below its degradation temperature.

6. The imido polymer as defined by claim 1, in thermosetting prepolymer state, soluble in polar organic solvents, and having a softening point at a temperature of less than 200° C.

7. A shaped article comprising the imido polymer as defined by claim 5.

8. A shaped article comprising the imido polymer as defined by claim 6.

9. The shaped article as defined by claim 8, comprising a prepreg.

10. The imido polymer as defined by claim 1, said imidazole compound having the formula:

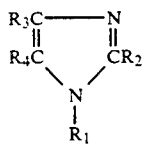 (III)

in which $R_1$, $R_2$, $R_3$ and $R_4$, which are identical or different, are each a hydrogen atom, an alkyl or alkoxy radical containing from 1 to 20 carbon atoms, or a vinyl, phenyl or nitro radical, with the proviso that $R_3$ may form, together with $R_4$ and the carbon atoms from which they depend, a single hydrocarbon ring member.

11. The imido polymer as defined by claim 10, said imidazole compound comprising imidazole or glyoxaline, 1-methylimidazole, 2-methylimidazole, 1,2-dimethylimidazole, 1-vinylimidazole, 1-vinyl-2-methylimidazole or benzimidazole.

* * * * *

UNITED STATES PATENT AND TRADEMARK OFFICE
CERTIFICATE OF CORRECTION

PATENT NO. : 5,037,923
DATED : August 6, 1991
INVENTOR(S) : Rene ARPIN

It is certified that error appears in the above-identified patent and that said Letters Patent is hereby corrected as shown below:

Please add the following priority document information to the cover page of the patent.

--[30]  Foreign Application   Priority Date

October 24, 1986 [FR]   France..........86 15020--

Signed and Sealed this

Thirteenth Day of April, 1993

Attest:

STEPHEN G. KUNIN

*Attesting Officer*     *Acting Commissioner of Patents and Trademarks*